United States Patent
Koshy et al.

(10) Patent No.: US 10,271,260 B2
(45) Date of Patent: Apr. 23, 2019

(54) DYNAMIC ANTENNA CONFIGURATION ON SYSTEMS WITH SPARE ANTENNAS

(71) Applicant: Dell Products L.P., Round Rock, TX (US)

(72) Inventors: Kamal J. Koshy, Austin, TX (US); Sinem K. Gulbay, Austin, TX (US); Ching Wei Chang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/712,461

(22) Filed: Sep. 22, 2017

(65) Prior Publication Data
US 2019/0098553 A1    Mar. 28, 2019

(51) Int. Cl.
*H04W 40/06* (2009.01)
*G01S 1/04* (2006.01)
*H04W 40/08* (2009.01)
*H01Q 21/29* (2006.01)

(52) U.S. Cl.
CPC ............ *H04W 40/06* (2013.01); *G01S 1/045* (2013.01); *H01Q 21/29* (2013.01); *H04W 40/08* (2013.01)

(58) Field of Classification Search
None
See application file for complete search history.

(56) References Cited

U.S. PATENT DOCUMENTS

| | | | | |
|---|---|---|---|---|
| 5,649,306 A | * | 7/1997 | Vannatta | H01Q 1/084 343/702 |
| 8,532,587 B2 | * | 9/2013 | Lagnado | G06F 1/162 455/101 |
| 2005/0085195 A1 | * | 4/2005 | Tong | H04B 7/061 455/101 |
| 2006/0046662 A1 | * | 3/2006 | Moulsley | H04B 7/0689 455/69 |

* cited by examiner

*Primary Examiner* — Mohammed Rachedine
(74) *Attorney, Agent, or Firm* — Campbell Stephenson LLP; Shiv S. Naimpally

(57) ABSTRACT

A computing device with a Dynamic Antenna Configuration Manager (DACM) for sharing of spare antennas with dedicated (wireless mode-specific) primary antennas in the computing device, which supports multiple wireless modes of operation and includes at least one shared spare antenna operable as a broadband Radio Frequency (RF) antenna over all of the device-supported wireless modes. The DACM dynamically allocates spare antennas based on active wireless connections, device usage modes, device orientation/configuration, and other user visible metrics so as to optimize user experience. Such dynamic-sharing allows device support for multiple wireless protocols (or modes of operation), but with less than the total of individual protocol-specific maximum antennas. As a result, a dynamic (variable) number of Multiple-Input Multiple-Output (MIMO) streams per wireless mode of operation may be supported within the space constraints imposed by device real estate, thereby providing the end user with a better wireless experience than with other design choices.

20 Claims, 6 Drawing Sheets

DYNAMIC ANTENNA CONFIGURATION ON SYSTEMS WITH SPARE ANTENNAS

TECHNICAL FIELD

This disclosure relates generally to antenna systems for consumer devices and, more particularly, to antenna-sharing on systems with shared spare antennas (operating in multiple bands and supporting multiple wireless protocols) in which shared spare antennas are dynamically allocated based on active connections, device usage modes, and device orientation by dedicating the shared spare antennas to those connections that yield the best performance.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as portable computing devices, may include, for example, tablet computers, laptops, smartphones, User Equipments (UEs), cellular telephones or data transfer equipments, and the like. In addition to supporting data processing and computing functionalities, these devices also offer wireless communication capabilities for voice, picture, video, and/or other data communication. The same device may support more than one type of technology for wireless communication. For example, the device may support a Wireless Fidelity (Wi-Fi®) connection, a Bluetooth® connection, and a cellular network connection such as talk, text, and data communication over a cellular Long Term Evolution (LTE) network. The user may select one of these connections for wireless communication or may keep more than one connection/technology active simultaneously for different communication needs.

To support different wireless technologies requiring wireless communication over different Radio Frequency (RF) bands, current consumer devices include two or more technology-specific (or wireless mode-specific) RF antennas embedded at different locations inside the device. These antennas are statically assigned to corresponding wireless modes of operation. For example, one set of antennas may be dedicated to support Wi-Fi and Bluetooth connections, whereas another set of antennas may be dedicated for LTE connections. In other words, current consumer devices primarily include a fixed number of dedicated antennas per wireless protocol (or wireless mode of operation). As a result, the number of Multiple-Input Multiple-Output (MIMO) streams supported per wireless protocol are also fixed.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques are described herein for sharing of spare antennas with dedicated (wireless mode-specific) primary antennas in consumer devices that support multiple wireless protocols (or modes of operation) and include at least one shared spare antenna operable as a broadband RF antenna over all of the device-supported wireless protocols. A mechanism is disclosed to dynamically allocate spare antennas based on active wireless connections, device usage modes, device orientation/configuration, and/or other user visible metrics so as to optimize user experience. Due to the proliferation of wireless protocols and RF bands to be supported in a consumer device, it may become increasingly difficult to allocate static antennas or MIMO configurations in devices because of ID and physical space (device real estate) constraints to accommodate a large number of technology-specific antennas on the device. In particular embodiments, a mechanism is described that allows device support for multiple protocols, but with less than the total of individual protocol-specific maximum antennas. At least one broadband spare antenna is provided on the device and is shared with other primary/default (wireless mode-specific) antennas on the device. Although a user still manually (for example, through a User Interface (UI) on a display screen of the user's device) may select one or more supported technologies (Wi-Fi, Bluetooth®, LTE, and so on) to be activated for user's wireless needs, the user need not manually operate a button/switch to connect the spare antenna(s) for the desired wireless configuration. The mechanism disclosed herein may dynamically and automatically perform necessary switching of the shared spare antenna(s), as well as the routine frequency band switching for a wireless mode-specific (default) antenna. Such dynamic configuration of spare antenna(s) may substantially improve the overall signal quality for the multiple wireless technologies supported by the device, resulting in a better wireless experience for the end user of the device.

In one embodiment, the present disclosure is directed to a method, which comprises: (i) activating, by a computing device, a wireless mode of operation from a plurality of wireless modes of operation; (ii) selecting, by the computing device, an antenna from a plurality of wireless mode-specific antennas as a default antenna for the wireless mode of operation; (iii) generating, by the computing device, a connectivity score representing a performance of wireless transmissions/receptions by the computing device relative to one or more of a plurality of Key Performance Indicators (KPIs) based on selecting the default antenna; (iv) determining, by the computing device, an increase in the connectivity score based on selecting a spare antenna in the computing device in each wireless mode of operation that is active, wherein the spare antenna is used in addition to the plurality of wireless mode-specific antennas in the computing device; and (v) operating, by the computing device, the spare antenna in a particular wireless mode of operation that results in a highest respective increase in the connectivity score.

In particular embodiments, the plurality of KPIs comprises: (i) signal quality of a wireless transmission/reception; (ii) power consumption for a wireless transmission/reception; (iii) latency associated with a wireless transmission/reception; (iv) throughput of a wireless transmission/reception; and (iv) processing cost of a wireless transmission/reception.

In another embodiment, the present disclosure is directed to a method that comprises: (i) when a first wireless mode of operation is active, operating, by a computing device, a first antenna as a default antenna for the first wireless mode of operation, wherein the computing device has three different antennas comprising the first antenna, a second antenna, and a third antenna; (ii) when a second wireless mode of operation is active, operating, by the computing device, the second antenna as a default antenna for the second wireless mode of operation, wherein the first and the second wireless modes of operation are different; (iii) generating, by the computing device, a connectivity score representing a performance of wireless transmissions/receptions by the computing device relative to one or more of a plurality of KPIs when the first and the second antennas are operated as default antennas; (iv) determining, by the computing device, a respective increase in the connectivity score based on selecting the third antenna in each of the first and the second wireless modes of operation; and (v) operating, by the computing device, the third antenna in that one of the first and the second wireless modes of operation which results in a higher respective increase in the connectivity score.

In yet another embodiment, the present disclosure is directed to a computing device, which comprises: (i) a memory for storing program instructions; (ii) a plurality of wireless mode-specific antennas; (iii) a spare antenna that is in addition to the plurality of wireless mode-specific antennas; and (iv) a processor coupled to the memory, the plurality of wireless mode-specific antennas, and the spare antenna. In the computing device, the processor executes the program instructions to: (a) activate a wireless mode of operation from a plurality of wireless modes of operation; (b) select an antenna from the plurality of wireless mode-specific antennas as a default antenna for the wireless mode of operation; (c) generate a connectivity score representing a performance of wireless transmissions/receptions by the computing device relative to one or more of a plurality of KPIs based on selecting the default antenna; (d) determine an increase in the connectivity score based on selecting the spare antenna in the computing device in each wireless mode of operation that is active, wherein the spare antenna is used in addition to the plurality of wireless mode-specific antennas in the computing device; and (e) operate the spare antenna in a particular wireless mode of operation that results in a highest increase in the connectivity score.

In a further embodiment, the present disclosure is directed to a computer program product comprising a non-transitory computer-usable medium having computer-readable program code embodied therein. In the computer program product, the computer-readable program code is executable by a computing device to implement a method comprising: (i) activating a wireless mode of operation from a plurality of wireless modes of operation; (ii) selecting an antenna from a plurality of wireless mode-specific as a default antenna for the wireless mode of operation; (iii) generating a connectivity score representing a performance of wireless transmissions/receptions by the computing device relative to one or more of a plurality of KPIs based on selecting the default antenna; (iv) determining an increase in the connectivity score based on selecting a spare antenna in the computing device in each wireless mode of operation that is active, wherein the spare antenna is used in addition to the plurality of wireless mode-specific antennas in the computing device; and (v) operating the spare antenna in a particular wireless mode of operation that results in a highest increase in the connectivity score.

During normal usage, it is typically difficult to design for all user behaviors and concurrent operations (of different wireless modes). Typically, in many instances, the wireless mode-specific (default) antennas in a device may not be sufficient to support a dynamic number of MIMO streams and associated wireless technologies and bands. The availability of shared spare antennas and dynamic antenna configuration of main (default) and spare antennas as per teachings of particular embodiments of the present disclosure to those connections that yield the best overall wireless performance may result in an optimized antenna configuration that provides the user with a better wireless experience than is possible with dedicated antennas alone.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

Figure 1:
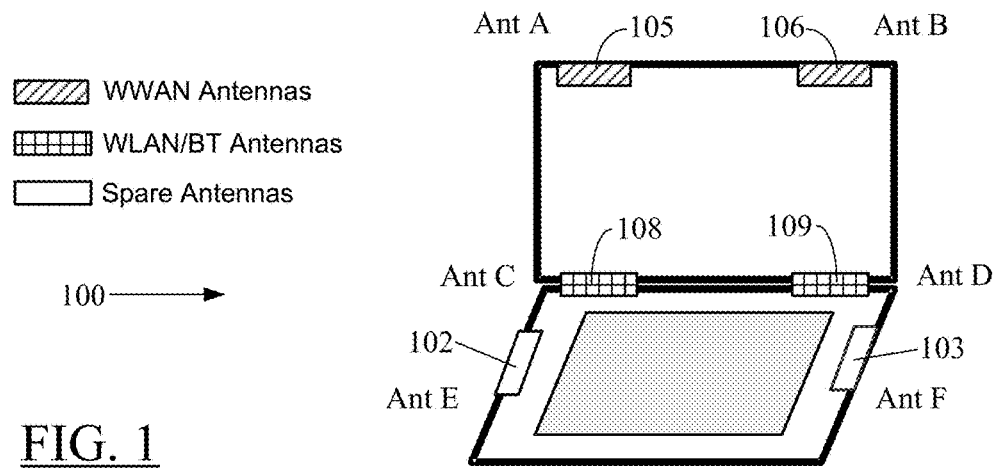
FIG. 1 illustrates a computing device with at least one shared spare antenna as per particular embodiments of the present disclosure.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As used herein, the terms "consumer device," "computing device," or "mobile unit" may be used interchangeably to refer to a portable computing unit with wireless communication capability. In particular embodiments, such unit may be the above-mentioned information handling system. In other embodiments, such unit may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for personal, business, scientific, control, or other purposes. For example, as mentioned before, a consumer device or mobile unit may be a personal computer (e.g., a laptop), tablet computer, mobile device (e.g., personal digital assistant (PDA) or smart phone), a UE, or any other suitable device, and may vary in size, shape, performance, functionality, and price.

It is noted here that, for ease of discussion, a unit or module may be referred to as "performing," "accomplishing," or "carrying out" a function or process. The unit may be implemented in hardware and/or software. However, it is evident to one skilled in the art that such performance may be technically accomplished by a processor when appropriate software or program code is executed by the processor. The program execution would cause the processor to perform the tasks or steps instructed by the software to accomplish the desired functionality or result. However, for the sake of convenience, in the discussion below, a processor or software component may be interchangeably considered as an "actor" performing the task or action described, without technically dissecting the underlying software execution mechanism. Furthermore, a hyphenated term (e.g., "technology-specific", "computer-readable", "Wi-Fi", etc.) may be occasionally interchangeably used with its non-hyphenated version (e.g., "technology specific," "computer readable", "WiFi", etc.), and a capitalized entry (e.g., "Spare Antenna", "Device Manager", "WiFi", etc.) may be interchangeably used with its non-capitalized version (e.g., "spare antenna", "device manager", "wifi", etc.). Such occasional interchangeable uses shall not be considered inconsistent with each other.

Wireless technologies or protocols such as WiFi®, BlueTooth®, Code Division Multiple Access (CDMA®), Global System for Mobile communications (GSM®), and other wireless technologies support communication over a corresponding pre-assigned Radio Frequency (RF) band. These technologies generally may fall under two broadly-defined wireless modes of operation, each having multiple RF bands associated with it for underlying wireless technologies. These two widely-used wireless modes of operation for consumer devices include the Wireless Local Area Network (WLAN) mode encompassing a number of different wireless technologies—such as WiFi®, BlueTooth®, and Zigbee® connections—having RF signals spanning the range of 900 MHz to 5 GHz, and the Wireless Wide Area Network (WWAN) mode primarily associated with cellular communication technologies—such as CDMA, GSM, and LTE—having RF signals spanning the range of 600 MHz to 6 GHz.

For example, the Wi-Fi® technology is based on the Institute of Electrical and Electronics Engineers (IEEE) WLAN 802.11 standard (including WLAN 802.11 n/ac/ax/ad/ay) and may commonly use frequencies in the 2.4 GHz and 5 GHz RF bands, and occasionally in the 60 GHz band. On the other hand, a WLAN Bluetooth® connection may operate over a 2.4 to 2.485 GHz band, whereas the IEEE 802.15.4 based WLAN ZigBee® connection may operate in one of the following Industrial Scientific and Medical (ISM) radio bands: 2.4 GHz in most jurisdictions worldwide; 784 MHz in China, 868 MHz in Europe, and 915 MHz in the USA and Australia. Furthermore, the WLAN 802.11ah protocol is associated with the 900 MHz band.

In case of WWAN licensed spectrum, the LTE standard covers a range of many different frequency bands in the range of 600 MHz to 2.6 GHz. For example, in North America, an LTE network may use on one or more of the following frequency bands: 700 MHz, 750 MHz, 800 MHz, 850 MHz, 1900 MHz, 1700/2100 MHz, 2300 MHz, 2500 MHz, and 2600 MHz. On the other hand, 2500 MHz band is assigned for LTE communication in South America, whereas 800 MHz, 1800 MHz and 2600 MHz bands are used for LTE in Asia. The WWAN licensed spectrum also includes the 28 GHz and 37-40 GHz bands for future Fifth Generation Millimeter Wave (5G mmWave) cellular networks, and the 3.4-4.2 GHz band for Citizen Band Radio Service (CBRS). On the other hand, WWAN unlicensed spectrum may support LTE-Unlicensed (LTE-U), LTE-License Assisted Access (LTE-LAA), and Enhanced LAA for LTE (LTE-eLAA) modes, which utilize the unlicensed RF spectrum typically in the 5 GHz band to provide additional radio spectrum. The 5 GHz WWAN unlicensed band also may be used for LTE-based MulteFire™ communication proposed by MulteFire Alliance (www.multefire.org). On the other hand, the 57-71 GHz band in the WWAN unlicensed spectrum may be allocated to future 5G mmWave cellular networks.

It is noted at the outset that the term "wireless mode of operation" may encompass a number of different wireless protocols or technologies and, hence, for ease of discussion, it is used herein as a representative of such protocols/technologies. For example, the term "WWAN" is used as a representative of LTE and other current/future cellular technologies (e.g., GSM, CDMA, LTE-AAA, 5G mmWave, and so on), and relevant non-LTE protocols (e.g., CBRS) as well. Similarly, the term "WLAN" can represent Wi-Fi®, Bluetooth®, Zigbee®, and other current or future short-range or long-range wireless modes (such as, for example, Near Field Communication (NFC) protocols, and Machine-to-Machine (M2M) communication protocols) not specifically mentioned here. Thus, although the terms "wireless mode" and "wireless protocol" may be occasionally used interchangeably herein, it is understood that the discussion broadly relates to the relevant wireless mode of operation, unless the context dictates otherwise.

To support different wireless technologies requiring wireless communication over different RF bands, consumer devices may include two or more technology-specific RF antennas embedded at different locations inside the device. The antenna system designs for consumer devices are custom designs and on a per-platform basis. The antennas are designed and placed specifically to meet the needs of a particular platform, such as the device type (tablet, phone, laptop computer, or the like), device geometry/shape, device structure, and wireless communication features (or protocol support) offered. Furthermore, the antennas may operate at specific target frequencies. For example, an antenna may be dedicated for WLAN communication and may be unable to perform communication over LTE bands. Similarly, another antenna may be specifically configured to support LTE communication, and may not cover the Wi-Fi® and Bluetooth® bands. Because of such target frequency-related restrictions, current antenna systems for a platform that requires support for a number of different wireless technologies/frequency bands would occupy substantial real estate (or physical space) within the device to accommodate all different technology-specific antennas.

Furthermore, although current technology-specific antenna solutions use switching techniques or algorithms for frequency band switching on a single antenna or beamforming techniques to enable the antenna to support multiple frequency bands of the associated wireless mode of operation (for example, with frequency band switching, a dedicated WLAN antenna may be configured to support operations over different WLAN protocols like Wi-Fi®, Bluetooth®, and so on, in the 2.4 GHz and 5 GHz RF bands), such solutions still do not eliminate the need for physical space within the device to accommodate multiple, statically-configured antennas to support a wide array of different wireless technologies.

The earlier discussion above provided just a few examples of currently popular WLAN and WWAN protocols. It is observed, however, that the number of wireless protocols and bands to be supported in devices is increasing. Current antenna solutions primarily focus on a fixed number of antennas (and, hence, by extension, a fixed number of MIMO streams) per protocol. However, with the advent of the ability of wireless standards to support a dynamic number of MIMO streams (1×1, 2×2, 4×4, and so on), and the proliferation of supported technologies and bands, it has become difficult to allocate static antennas or MIMO configurations in devices due to antenna ID and physical space (device real estate) constraints to accommodate a large number of technology-specific antennas on the device. As a result, in many cases, certain protocols and standards are not supported in devices due to such space and ID constraints. Although some current solutions provide for dynamic selection and configuration of antennas based on use case and orientation of the device, the number of MIMO streams per technology (and, by extension, the number of antennas) is still fixed. As a result, such solutions still require a large number of antennas to support multiple protocols and MIMO streams.

The proliferation of connected devices and rise of device-to-device communications are creating a need to support a wide variety of wireless technologies in end user devices. Furthermore, the emerging-use cases such as cloud-based applications, edge computing, Augmented Reality (AR) or Virtual Reality (VR) applications, and fast growing Internet video and gaming, require high bandwidth and low latency connections. The need for high wireless speeds and wide range of connectivity is driving end user devices to adopt more spare antennas to provide higher MIMO benefits, and support new wireless protocols and bands. However, simply adding spare antennas may not suffice, especially when spare antennas are only statically-assigned to one wireless protocol or restricted in use to simply monitor network usage.

It is therefore observed that, while adding spare antennas may be a key enabler to meet the new performance and connectivity requirements, the space constraints on a device may require some of the spare antennas to be shared between multiple radio technologies to accommodate the increasing number of wireless technologies/protocols to be supported by the device. Hence, it is desirable to devise a mechanism to share antennas for devices that support multiple protocols.

In particular embodiments, the present disclosure relates to a mechanism that optimizes the antenna-sharing on systems with at least one shared spare antenna operating in multiple bands and supporting multiple wireless protocols. The mechanism dynamically allocates spare antennas in a device based on active wireless connections, usage modes, device configuration/orientation, and other user-visible metrics. Such dynamic-sharing of spare antennas with wireless mode-specific "primary" (or default) antennas results in a number of antennas that is less than the total number of individual protocol-specific maximum antennas required under existing static antenna configuration discussed earlier. As a result, a dynamic (variable) number of MIMO streams per wireless mode may be supported within the space constraints imposed by device real estate, thereby providing the end user with a better wireless experience than with other design choices.

Figure 6:
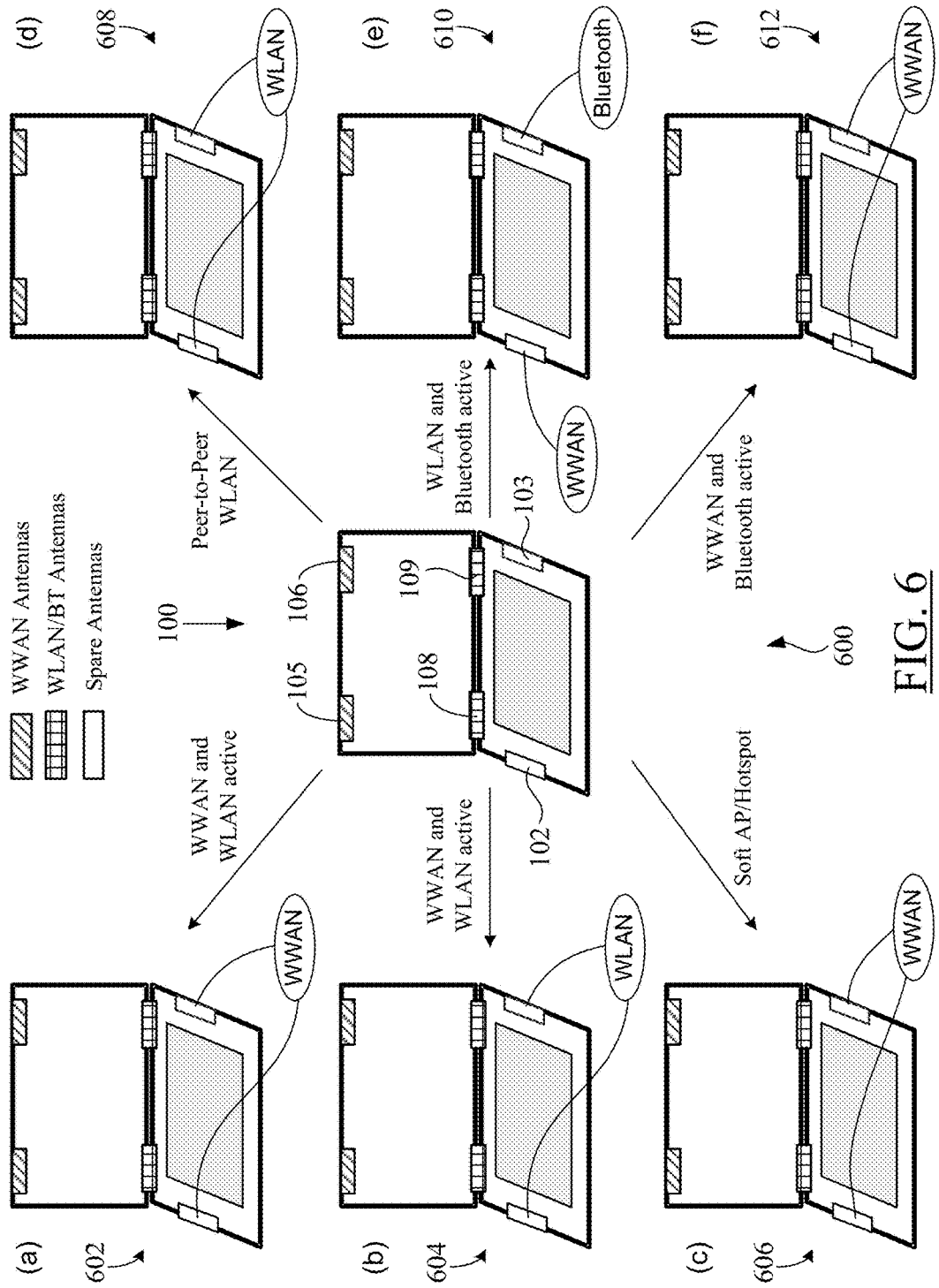
FIG. 6 illustrates an exemplary set of antenna assignments by the DACM module as per the flowchart in FIG. 5 across several use cases.

FIG. 1 illustrates a computing device 100 with at least one shared spare antenna as per particular embodiments of the present disclosure. In the embodiment of FIG. 1, the device 100 is shown to have two shared spare antennas 102-103 (antennas E and F, respectively). Although the computing device 100 is shown in FIG. 1 as a laptop computer, such illustration is by way of an example only. It is noted that the teachings of the present disclosure may apply to any of the earlier-mentioned information handling systems or devices (like desktop computers, smartphones, tablets, etc.) so long as the device has at least one shared spare antenna operable over multiple radio technologies (associated with multiple wireless modes of operation) and the device supports at least two different wireless modes of operation. In the embodiment of FIG. 1, the computing device 100 is shown to include two pairs of wireless mode-specific antennas 105-106 (antennas A and B, respectively) and 108-109 (antennas C and D, respectively), each pair associated with a specific wireless mode of operation. For example, the antennas 105-106 are shown as WWAN-specific antennas, whereas the antennas 108-109 are shown to be WLAN-specific antennas (including Bluetooth® (BT) support). In FIGS. 1 and 6, the WWAN mode is indicated using a block with slanted lines, whereas the WLAN mode is indicated using a block with a cross-hatched pattern. The spare antennas 102-103 are shown using blank blocks.

Thus, it can be seen from FIG. 1 that the device 100 supports at least two different radio technologies (for example, Wi-Fi and LTE, Bluetooth and LTE, or WiFi, BT, Zigbee, LTE, and LTE-LAA) associated with two wireless modes of operation—WWAN and WLAN. These wireless mode-specific antennas 105-106 and 108-109 may be specifically designed to cover only their respective wireless mode-specific RF bands and, as discussed later, one or more of these antennas may be selected as "primary" or "default" antennas when their corresponding wireless mode of operation is active.

It is noted here that the antenna placement and wireless mode assignments in FIG. 1 are for illustration only; actual antenna size, the number of antennas dedicated to a specific wireless mode, and antenna placement may vary from manufacturer to manufacturer and from product to product. For example, contrary to what is shown in FIG. 1, in certain embodiments, there may not be an identical number of antennas per wireless mode. Furthermore, the total number of antennas shown in FIG. 1 is for illustrative purpose as well. For example, in some embodiments, there may be a total of only three antennas: one WWAN-specific antenna, one WLAN-specific antenna, and one spare antenna. In other embodiments, there may be a total of four antennas: one WWAN antenna, one WLAN antenna, and two spare antennas. In yet other embodiments, there may be a total of eight antennas: three WLAN antennas, three WWAN antennas, and two spare antennas. In another embodiment, there may be a total of eight antennas: two WLAN antennas, two WWAN antennas, two spare antennas, and two antennas dedicated as default antennas for radio signals not specifically processed by WLAN-specific and WWAN-specific antennas in the device—such as, for example, NFC signals, M2M communication signals, or RF signals associated with current or future short-range or long-range wireless modes not specifically mentioned here. Other combinations of default and spare antennas may be devised as per design considerations.

An antenna may be considered a "spare" antenna when the total number of antennas in the device is larger than the total number of spatial wireless streams that may be simultaneously supported by wireless mode-specific default/primary antennas in the device. For example, in case of the embodiment in FIG. 1, it is observed that there are two (2) spare antennas 102-103 in the total of six (6) antennas because the total number of spatial streams simultaneously supported by the default antennas in the device is four (4)—two WWAN spatial streams may be simultaneously supported by the two WWAN-specific default antennas 105-106 and two WLAN spatial streams may be simultaneously supported using the two WLAN-specific antennas 108-109. As another example, in case of a device with a total of five (5) antennas with three (3) WLAN-specific default antennas and one (1) WWAN-specific default antenna, the fifth (non-default) antenna may be treated as a "spare" antenna that can be operationally shared with the wireless mode-specific four (4) "primary" (or default) antennas. It is understood that, to be sharable with a primary/default antenna, a spare antenna has to be a broadband antenna operable to wirelessly transmit and receive over a plurality of RF ranges associated with each wireless mode of operation supported by the respective default antenna in the device.

Figure 2:
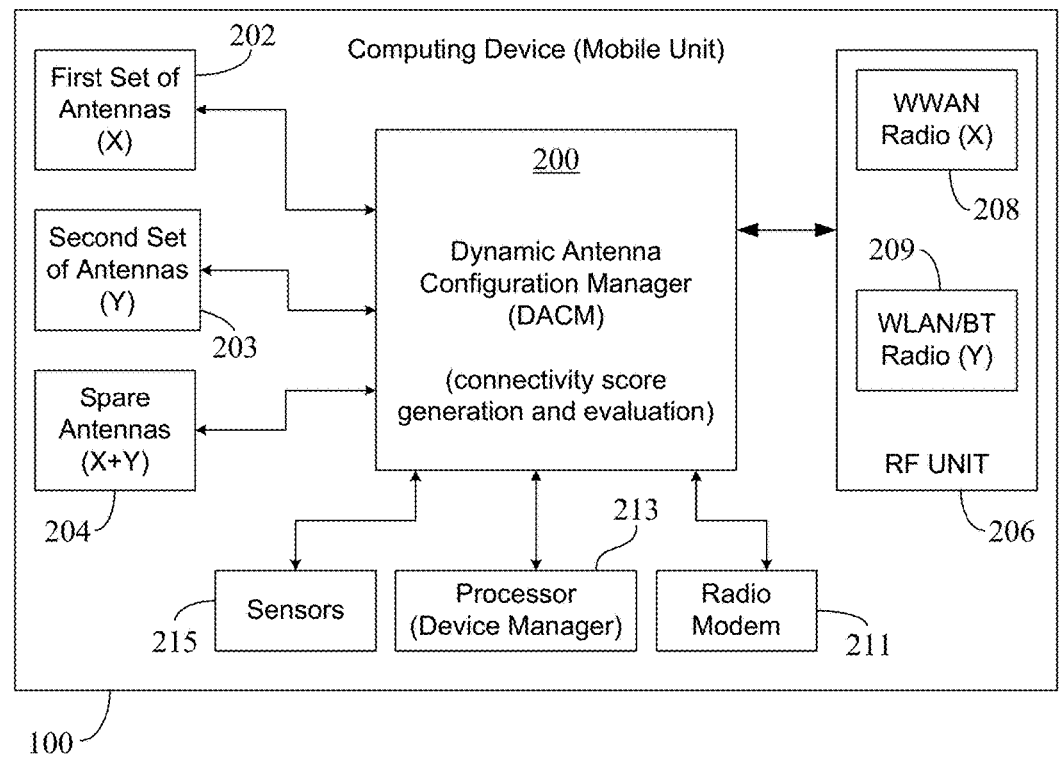
FIG. 2 is a block diagram of a portion of the computing device in FIG. 1 that includes multiple broadband antennas and a Dynamic Antenna Configuration Manager (DACM) module according to some embodiments.

FIG. 2 is a block diagram of a portion of the computing device 100 in FIG. 1 that includes multiple broadband antennas and a Dynamic Antenna Configuration Manager (DACM) module 200 according to some embodiments. The DACM module 200 may perform dynamic antenna configuration based on connectivity score generation and evaluation as per particular embodiments of the present disclosure, including the embodiments shown in FIGS. 3-5, which are discussed later below. It is noted at the outset that a single module 200 is shown for ease of illustration only; the DACM functionality may be implemented in a distributed manner as well through multiple discrete modules. The components shown in FIG. 2 may be encased within a housing of the computing device 100 and, for ease of discussion, the reference numeral "100" also may refer to such housing. In particular embodiments, such as the embodiments shown in FIGS. 1 and 6, the computing device 100 may include two housings coupled to each other via one or more hinges. The hinges may enable the two housings to be positioned at different angles relative to each other in different orientations (e.g., vertical orientations and horizontal orientations). Of course, additional housings may be attached via additional hinges to create a computing device with multiple housings. In the discussion herein, the reference numeral "100" collectively refers to all such housings.

As shown in FIG. 2, the computing device 100 may include a first set of antennas 202, a second set of antennas 203, and a set of spare antennas 204. In one embodiment, each of the three sets of antennas 202-204 may include at least one antenna. In another embodiment, each of the three sets of antennas 202-204 may include an identical number of antennas. Thus, in the context of FIG. 1, the first set 202 may include the WWAN-specific default antennas 105-106, the second set 203 may include the WLAN-specific default antennas 108-109, and the spare set of antennas 204 may include the spare antennas 102-103. In the embodiment of FIG. 2, each antenna in the three sets of antennas 202-204 may be a wideband (or broadband) antenna operable to wirelessly transmit and receive over a plurality of RF bands. For example, each antenna in the first set 202 maybe a single feed RF cable antenna covering the WWAN frequencies in the range of 600 MHz to 6 GHz. Thus, each antenna in the first set 202 may be operated by the DACM module 200 as primary/default antennas to support wireless communication over any of a number of different WWAN protocols (such as, for example, LTE, CDMA, LTE-LAA, and so on). Similarly, each antenna in the second set 203 maybe a single feed RF cable antenna covering the WLAN frequencies in the range of 900 MHz to 5 GHz. Thus, each antenna in the second set 203 may be operated by the DACM module 200 as primary/default antennas to support wireless communication over any of a number of different WLAN protocols (such as, for example, WiFi®, Bluetooth®, and so on). On the other hand, each spare antenna in the spare set 204 maybe a single feed RF cable antenna covering the WWAN as well as WLAN frequencies in the range of 600 MHz to 6 GHz. This allows a spare antenna to be dynamically shared with wireless mode-specific primary antennas, as discussed later. Thus, each antenna in the spare set 204 may be operated, as needed, by the DACM module 200 to support wireless communication over any of a number of different WWAN or WLAN protocols. The details about various WWAN and WLAN protocols/technologies and their respective RF bands are already given before and, hence, such details are not repeated here for the sake of brevity.

It is observed here that the antennas in the first and second sets 202-203 may be statically-configured—for example, by the DACM module 200—to operate only over the technology-specific RF bands associated with their respective wireless mode of operation. Thus, the antennas in the first and second sets 202-203 may not be operated to cover additional RF bands associated with other wireless technologies. For example, a WWAN-specific antenna in the first set 202 may not be operated to perform WiFi communication, and vice versa. However, as detailed below, each spare antenna in the spare set 204 may be dynamically configured to operate over WLAN bands, WWAN bands, or other (future) RF bands, as needed. In particular embodiments, two or more of the antennas in the sets 202-204 may be operable in a MIMO configuration In some embodiments, a dynamic number of MIMO streams (2×2, 4×4, etc.) also may be supported through the dynamic sharing of the spare antennas 102-103.

An RF unit 206 is shown to be in communication with the DACM module 200 and having a number of wireless mode-specific component units 208-209 operable to process the signals to be transmitted from or already received by the corresponding antennas in the three sets of antennas 202-204 with a specific protocol frequency range and format. For example, the component unit 208 may process WWAN signals such as the cellular radio signals associated with LTE or non-LTE cellular technologies, whereas the component unit 209 may process WiFi®, Bluetooth® (BT), and related WLAN communication. In certain embodiments, an additional component unit (not shown) may be provided in the RF unit 206 to process other types of radio signals—such as, for example, NFC signals, M2M communication signals, or RF signals associated with current or future short-range or long-range wireless modes not specifically covered by the component units 208-209. Depending on the requirements of a new wireless protocol, the device 100 may be configured, for example, through a protocol-specific software download/update, to provide support for the additional/future wireless mode. The letters "X" and "Y" at blocks 208-209, respectively, in the RF unit 206 in FIG. 2 are used merely to indicate that each block processes signals associated with a different wireless mode of operation. Thus, the letter "X" is mentioned at block 202 because of WWAN-specific antennas 105-106 associated therewith, and the letter "Y" is mentioned at block 203 to indicate WLAN-specific antennas 108-109 associated therewith. However, both of these letters ("X+Y") are mentioned at the block 204 to indicate that each spare antenna 102-103 is capable of transmitting/receiving RF signals over a wide range of frequencies covering all of the wireless modes supported by the device 100.

In particular embodiments, an RF unit, such as the RF unit 206, may include an RF baseband unit (not shown) that incorporates the functionalities of the components units, like the units 208-209. The RF unit also may include additional circuit elements, such as an RF Front End Module (RFFEM). In some embodiments, the RFFEM may incorporate the functionality of a radio modem, like the radio modem 211 discussed below.

Briefly, during transmission, protocol-specific pre-processing of content to be wirelessly transmitted may be performed by appropriate component unit 208-209 selected by the DACM module 200 under operative control of a processor (or device manager) 213 in the device 100. In particular embodiments, either the processor 213 or the DACM module 200 may be configured to detect the wireless mode of operation of the device 100 based on, for example, one or more user inputs received by the device 100 as discussed below. Thereafter, the content may be processed by a radio modem 211 and sent to the appropriate one of the broadband antennas in the sets 202-204 via an RF crossbar unit (or crossbar switch) (not shown) under operative control of the DACM module 200. In particular embodiments, the DACM module 200 may include the RF crossbar switch or RF crossbar functionality to be able to select the appropriate antenna—a wireless mode-specific default antenna or a shared spare antenna—from among the available antennas for transmission of the content. During wireless reception, appropriate broadband antenna from the sets 202-204 may be initially selected by the DACM module 200 and the signals received from the selected antenna may be first processed by the radio modem 211 followed by protocol-specific processing by the RF unit 206. The de-modulated and detected content may be then processed by the device manager 213 as instructed by the device's 100 operating system (not shown) and any other application software (not shown) under execution by the processor 213.

As discussed in more detail below, in particular embodiments, the DACM module's 200 selection of an antenna (or switching from one antenna to the other) for transmission/reception under a specific wireless mode may be based on the device orientation as detected by one or more sensors in a sensor unit 215, which may contain a number of sensors placed throughout different locations within the computing device 100. The sensed signals or data from the sensors may be received by the sensor unit 215 and shared with the DACM module 200 for further processing under operative control of the device manager 213. Some exemplary sensors include proximity detection sensors that detect proximity of a human hand/body or a non-human object (such as metallic material) to the computing device 100, device orientation detection sensors including one or more accelerometers and/or gyroscopes, electrical noise detection sensors, device hinge angle detection sensors (for example, when the computing device 100 is formed of two or more parts hinged together as in case of the embodiments in FIGS. 1 and 6), and the like.

It is noted here that, in particular embodiments, a user of the device 100 may be given an option, such as, for example, via a user interface on a display screen of the device 100, to input the user's selection of the desired wireless mode(s) of operation. As a result, the user may select any one or a combination of the previously mentioned wireless technologies such as, for example, WiFi, Bluetooth, LTE, LTE-AAA, and so on. In one embodiment, the processor 213 may process the user input to identify (or detect) which one or more of the wireless communication protocols the user has selected to be supported by the device 100. The processor 213 also may provide the information about the user-selected wireless mode(s) to the DACM module 200 for appropriate antenna selection and switching to provide wireless communication support to the user. For example, if the DACM module 200 has initially selected the spare antenna 102 to be shared with WLAN antennas 108-109, the DACM module 200 may now switch the shared spare antenna 102 to operate as a WWAN antenna if wireless usage and workload has changed and/or current device orientation (or other sensed metric) dictates so.

In some embodiments, the DACM module 200 may be implemented as a combination of hardware (like logic gates, switches, and so on) and software (like microcode or a set of program instructions). In other embodiments, the DACM functionality may be implemented entirely in software. The processor 213 also may be implemented as a combination of hardware and software. In certain embodiments, the DACM module 200 may be a part of the processor unit 213 and, hence, may not be a separate entity as shown in FIG. 2. Regardless of the nature of implementation of DACM, it is observed here that DACM software/microcode, when executed by the processor 213 along with other relevant program code (such as, for example, the program code for the operating system of the computing device 100), may cause the computing device 100 to perform the tasks shown in the flowcharts of FIGS. 3-5, as well as other dynamic antenna configuration-related tasks discussed herein. Such tasks may include, for example, initially selecting the appropriate default antennas for the user-selected wireless mode(s), evaluating the sensor and non-sensor triggers, dynamically and automatically switching the shared spare antennas 102-103 based on the KPI-based evaluations and sensor triggers (if applicable), and the like. Although not shown in FIG. 2, but as discussed later in more detail with reference to FIG. 7, a mobile unit or computing device as per particular embodiments of the present disclosure also may include Random Access Memory (RAM), one or more processing resources such as a central processing unit (CPU) or hardware or software control logic, Read-Only Memory (ROM), and/or other types of volatile/non-volatile memory. Additional components of the mobile unit may include one or more disk drives, one or more network ports for communicating with external devices as well as various input and output (I/O) devices, such as a keyboard, a mouse, a touch-screen and/or video display. The computing device may also include one or more buses operable to transmit communications between the various hardware components.

Although not shown in FIGS. 1-2, other components located in the housing 100 may include at least one central processing unit (CPU), a graphics process unit (GPU), and a memory (e.g., computer-readable media). The GPU may be integrated into the CPU or may be a separate device from the CPU. In some cases, the computing device 100 may include one or more dedicated digital signal processing (DSP) processors. The CPU and GPU may be connected to one or more input-output (I/O) ports via an I/O bus. The I/O ports may include video ports (e.g., a video graphics adapter (VGA) port, a digital video interface (DVI) port, a high definition media interface (HDMI) port, a ThunderBolt® port, or the like), audio ports (e.g., microphone jack, headphone, jack, and the like), data ports (e.g., universal serial bus (USB) ports compliant with USB 2.0, USB 3.0, and the like), communication ports (e.g., Ethernet and the like), another type of port, or any combination thereof. The GPU may provide two or more lanes of an embedded DisplayPort (eDP) output that are sent to a display screen (not shown) in the housing 100. Alternatively, the GPU may provide two or more lanes of a DisplayPort (DP) output that are sent to the display screen.

Figure 3:
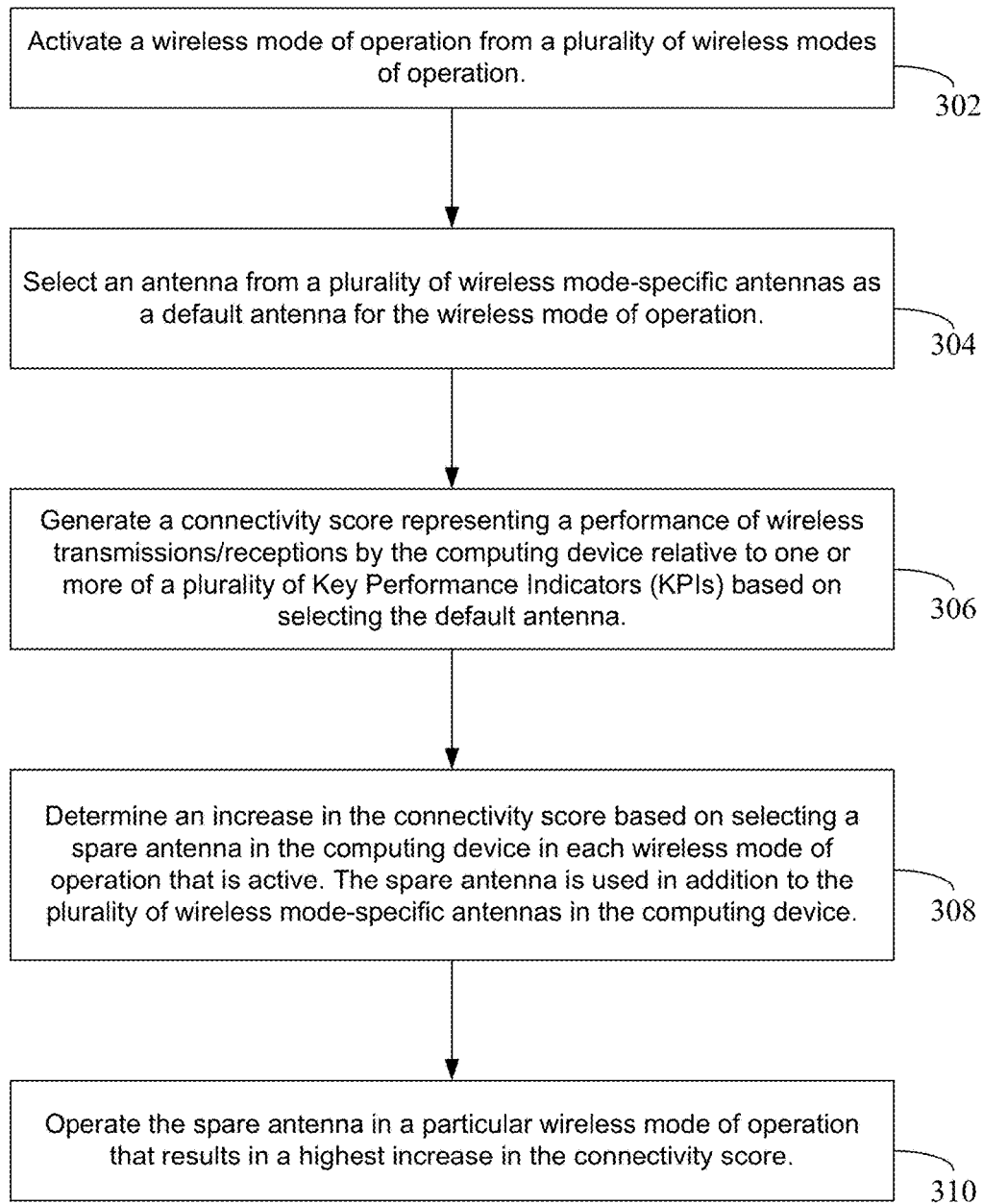
FIG. 3 illustrates an exemplary flowchart of a process to dynamically select a shared spare antenna according to particular embodiments.
Figure 4:
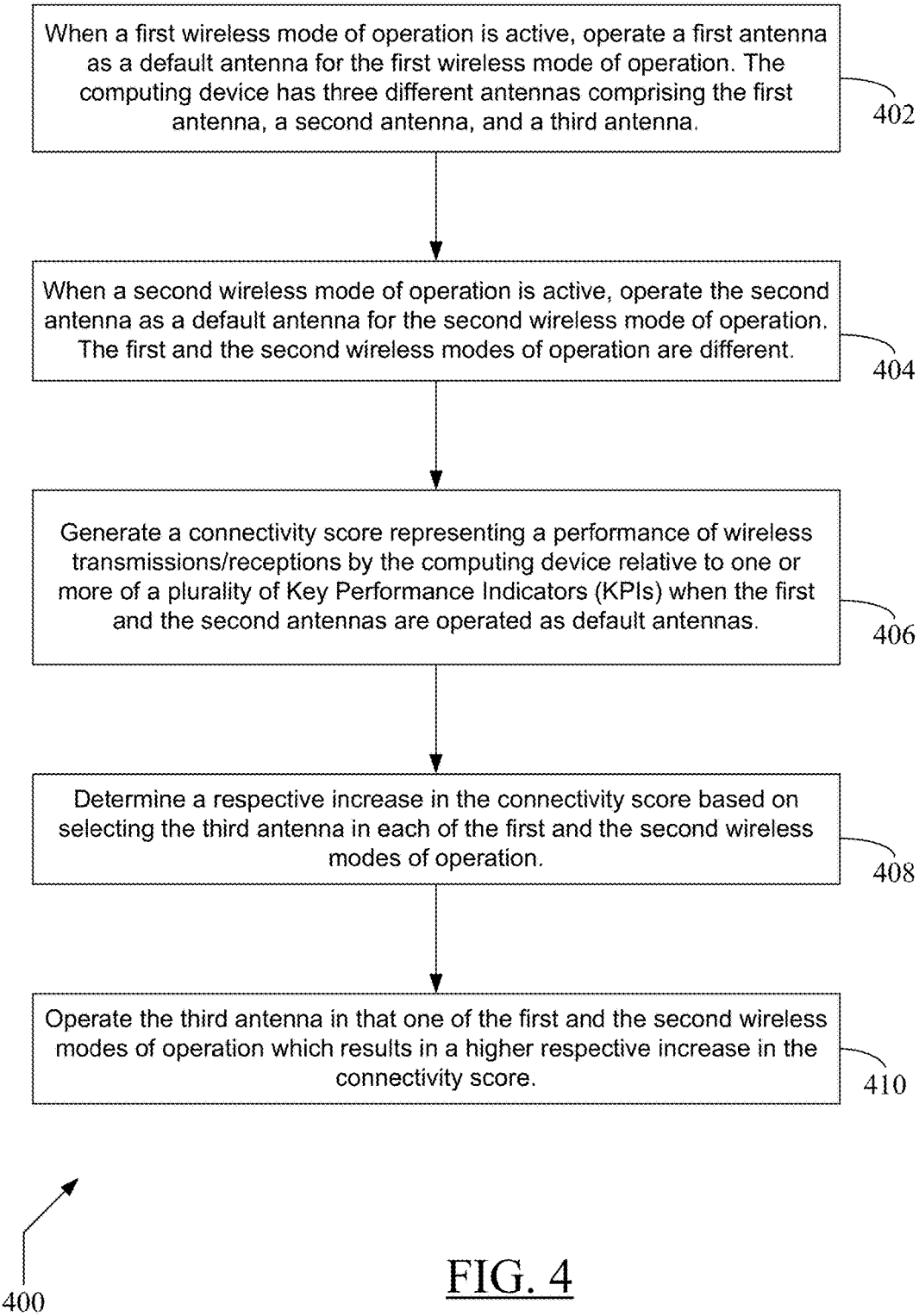
FIG. 4 is an exemplary flowchart of a process to dynamically select an operating configuration of a shared spare antenna according to particular embodiments.
Figure 5:
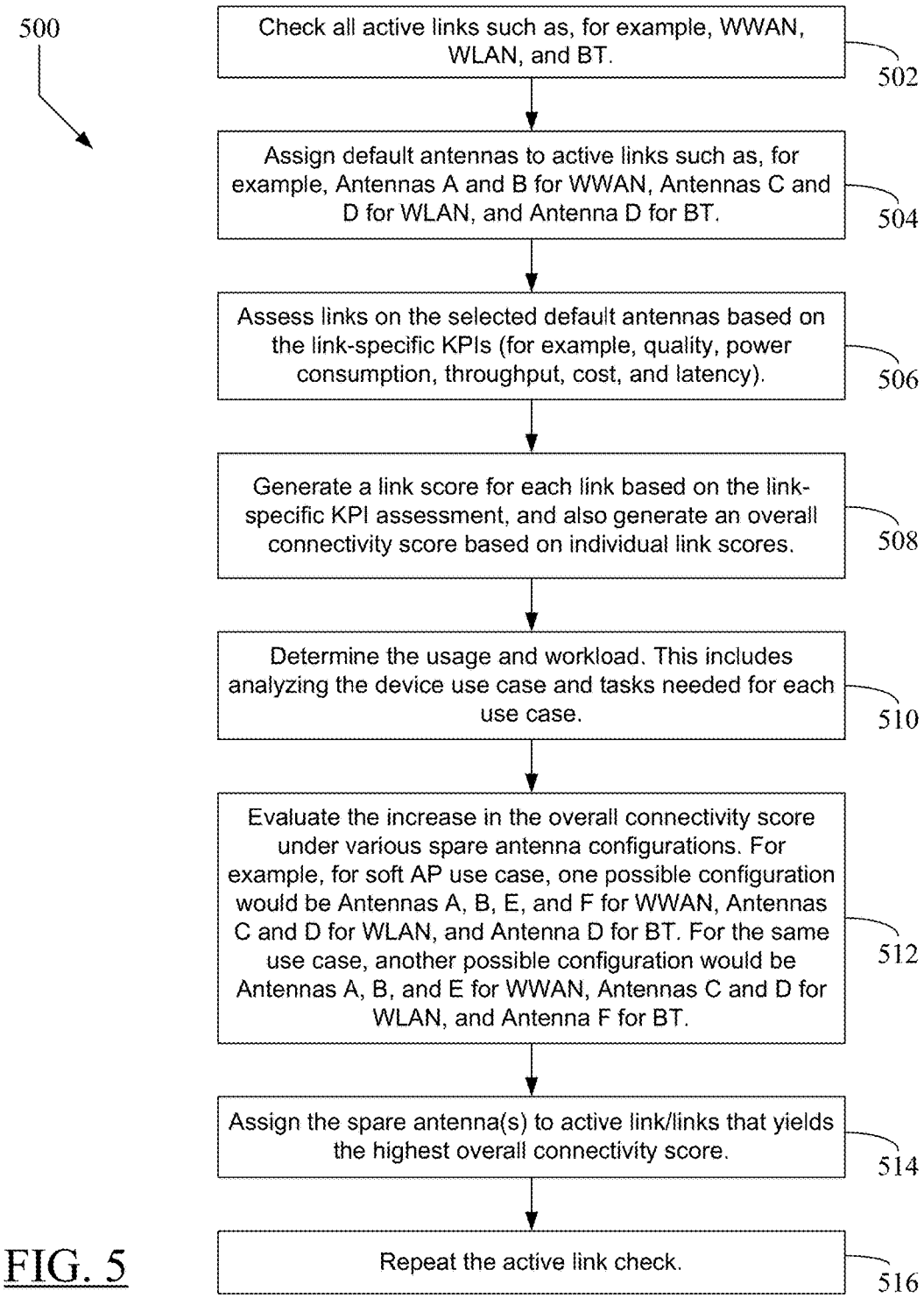
FIG. 5 is an exemplary flowchart of operations of a DACM module to dynamically select a shared spare antenna according to some embodiments.

Prior to discussing FIG. 3, it is noted that FIGS. 3-5 provide different flowcharts for the dynamic antenna configuration process as per particular embodiments of the present disclosure. In these flowcharts, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described in FIGS. 3-5 is not intended to be construed as a limitation, and any number of the described operations can be combined in any order and/or in parallel to implement the processes. For discussion purpose, although the dynamic antenna configuration process as per teachings of the present disclosure is described with reference to the process flow diagrams in FIGS. 3-5, other models, frameworks, systems and environments may be used to implement this process.

It is understood that any of the processes in FIGS. 3-5 may be performed by one or more components of the computing device 100 of FIGS. 1-2. The process tasks illustrated in one or more of the FIGS. 3-5 may be performed by a computing device, such as the computing device 100 having a DACM module—such as the module 200 in FIG. 2—as per particular embodiments of the present disclosure. As mentioned before, the program code contained in the DACM module may be executed by a processor in the computing device to enable the computing device to perform the tasks illustrated in the flowcharts of FIGS. 3-5.

FIG. 3 illustrates an exemplary flowchart 300 of a process to dynamically select a shared spare antenna according to particular embodiments. The shared spare antenna may be any one or both of the spare antennas 102-103 in FIG. 1. As noted at block 302, the computing device—like the computing device 100 in FIGS. 1-2—may activate a wireless mode of operation (for example, the WWAN mode) from a plurality of wireless modes of operation. The computing device may support a plurality of wireless modes of operation such as, for example, WWAN, WLAN, and so on. As noted at block 304, the computing device may select an antenna (for example, one or both of the antennas 105-106) from a plurality of wireless mode-specific antennas (here, the WWAN-specific antennas 105-106) as a default antenna for the wireless mode of operation (here, the WWAN mode). In some embodiments, the computing device may receive a mode selection input from the user selecting a wireless technology (for example, LTE, WiFi, BT, and so on) covered by a corresponding one of the supported wireless modes—WLAN and WWAN. The computing device may detect the user-selected wireless mode upon processing each mode selection input (which may select different wireless protocols/technologies supported by the device) from the user. In this manner, the computing device may activate a particular wireless mode of operation (WLAN or WWAN). Furthermore, the computing device may operate one or both of the antennas 105-106 as "default" antennas in the sense that these antennas may be operated exclusively for the WWAN mode (when active). Similarly, one or both of the antennas 108-109 may be "default" antennas for the WLAN mode in the sense that these antennas may be operated exclusively for the WLAN mode (when active).

At block 306, the computing device may generate a connectivity score representing a performance of wireless transmissions/receptions by the computing device relative to one or more of a plurality of Key Performance Indicators (KPIs) based on selecting the default antenna—such as for example, one or more of the antennas 105-106 and 108-109. Some exemplary KPIs include: (i) signal quality of a wireless transmission/reception; (ii) power consumption for a wireless transmission/reception; (iii) latency associated with a wireless transmission/reception; (iv) throughput of a wireless transmission/reception; and (v) processing cost of a wireless transmission/reception. Additional discussion of KPI-based assessment of a wireless link and generation of the connectivity score is provided later with reference to discussion of blocks 506 and 508 in the flowchart 500 in FIG. 5.

At block 308, the computing device may determine an increase in the connectivity score (generated at block 306) based on selecting a spare antenna—such as, for example, either or both of the spare antennas 102-103 in FIG. 1—in the computing device in each wireless mode of operation that is active. As discussed earlier, each spare antenna 102-103 is used in addition to the plurality of wireless mode-specific antennas 105-106, 108-109 in the computing device. As part of this determination, for example, the following antenna assignments for spare antennas 102-103 may be considered by the computing device when both wireless modes are active: (i) both of the spare antennas 102-103 may be considered "operational" in the WWAN mode; (ii) both of the spare antennas 102-103 may be considered "operational" in the WLAN mode; (iii) the spare antenna 102 may be considered "operational" in the WWAN mode and the spare antenna 103 may be considered "operational" in the WLAN mode; and (iv) the spare antenna 102 may be considered "operational" in the WLAN mode and the spare antenna 103 may be considered "operational" in the WWAN mode. It is noted here that the spare antennas may not be actually operated in the above-mentioned combinations. Rather, for the sake of evaluation at block 308, the computing device may hypothetically consider the spare antennas as "operational" in a given configuration along with other active (default) antennas. For each combination of spare and default antennas, the computing device may evaluate the respective increase in the connectivity score and thereafter operate a spare antenna (for example, either or both of the spare antennas 102-103 in the embodiment of FIG. 1) in a particular wireless mode of operation that results in the highest increase in the connectivity score, as noted at block 310.

Additional discussion of tasks described at blocks 308, 310 (related to dynamic configuration of a shared spare antenna) is provided later with reference to discussion of blocks 510, 512, and 514 in FIG. 5. It is noted here that, in some embodiments, when the computing device 100 is turned on, the DACM module 200 may initially place each antenna—such as the antennas 102-103, 105-106, and 108-109 in FIG. 1—in a pre-defined operating configuration. In certain embodiments, such pre-defined configuration also may be invoked in the absence of detection of a wireless mode of operation for the device 100. As is understood, while the device is being turned on, it may not be possible for the device user to select a specific wireless mode of operation. Therefore, in that case, each antenna may be initially placed in a pre-defined operating configuration until a mode selection input is received from the user. In one embodiment, such pre-defined configuration may be an "off" mode of operation for an antenna in which the antenna power is turned off so that the antenna may not transmit or receive any signals. In another embodiment, the pre-defined configuration may be an "idle" mode of operation for an antenna in which the antenna may be placed in a low-power state, but without any active transmissions or receptions by the antenna. When needed, an "idle" antenna may be quickly switched to the "traffic" mode to commence transmissions/receptions in a specific radio technology. In a further embodiment, the wireless mode-specific antennas 105-106 and 108-109 may be placed in the "idle" mode, whereas the shared spare antennas 102-103 may be placed in the "off" mode. Other pre-defined operating configurations may be devised as per design considerations, which may include, for example, analysis of a plurality of sensor outputs (such as, for example, sensor outputs related to device orientation, the status of one or more displays in the device, and so on), prior history of user's wireless mode selections, the status of wireless mode-specific software applications being activated by the user, and the like. The initially-established, pre-defined operating configuration may be automatically and dynamically changed by the DACM module 200 as per the process steps illustrated in any of the embodiments in FIGS. 3-5.

FIG. 4 is an exemplary flowchart 400 of a process to dynamically select an operating configuration of a shared spare antenna according to particular embodiments. The shared spare antenna may be any one or both of the spare antennas 102-103 in FIG. 1. The flowchart 400 in FIG. 4 is similar to the flowchart 300 in FIG. 3 in many aspects. Hence, for the sake of brevity, only a brief discussion of FIG. 4 is provided here. As noted at block 402 and as shown in FIG. 1, the computing device 100 may have three different antennas comprising a first antenna (for example, any one of the antennas 105-106), a second antenna (for example, any of the antennas 108-109), and a third antenna (for example, any of the antennas 102-103). When a first wireless mode of operation (for example, the WWAN mode) is active, the computing device 100 (for example, through the DACM module 200) may operate the first antenna as a default antenna for the first wireless mode of operation, as noted at block 402. Similarly, when a second wireless mode of operation (for example, the WLAN mode) is active, the computing device may operate the second antenna as a default antenna for the second wireless mode of operation, as noted at block 404. It is understood that the first and the second wireless modes of operation are different (block 404). At block 406, the computing device may generate a connectivity score representing the performance of wireless transmissions/receptions by the computing device relative to one or more KPIs when the first and the second antennas are operated as default antennas. Some examples of the KPIs are already provided before with reference to discussion of FIG. 3.

After the connectivity score is generated, the computing device may determine a respective increase in the connectivity score based on selecting the third antenna (mentioned at block 402) in each of the first and the second wireless modes of operation, as noted at block 408. As part of the determination at block 408, when both of the first and the second wireless modes are active, the computing device may perform the following two distinct tasks: (i) The third antenna may be hypothetically assumed to be "operational" in the first wireless mode, and, based on this assumption, the respective increase in the connectivity score may be determined when the first and the third antennas are considered operational in the first wireless mode, whereas the second antenna is operational in the second wireless mode. (ii) The third antenna may be hypothetically assumed to be "operational" in the second wireless mode, and, based on this assumption, the respective increase in the connectivity score may be determined when the second and the third antennas are considered operational in the second wireless mode, whereas the first antenna is operational in the first wireless mode. The determination at block 408 may indicate which one of the first and the second wireless modes of operation would provide a higher respective increase in the connectivity score if the third antenna were to be operated in that mode. Hence, at block 410, the DACM module 200 (and, hence, the computing device 100) may operate the third antenna in that one of the first and the second wireless modes of operation which results in a higher respective increase in the connectivity score during the determination task at block 408.

FIG. 5 is an exemplary flowchart 500 of operations of a DACM module, such as the DACM module 200 in FIG. 2, to dynamically select a shared spare antenna according to some embodiments. The spare antenna may be any or both of the antennas 102-103 in the embodiment of FIG. 1. As mentioned before, the program code contained in the DACM module 200 may be executed by a processor, such as the processor 213 in FIG. 2, in the computing device 100 to enable the computing device 100 to perform the tasks illustrated in the flowchart 500 of FIG. 5. Thus, although the DACM module 200 is mentioned as "performing" the operations shown in FIG. 5, it is understood that such operations are performed by the computing device 100.

Initially, at block 502, the DACM module 200 may check all active wireless links for the device 100 such as, for example, WWAN links (like one or more wireless links for streaming audio/video over an LTE network) and, WLAN links (such as BT and WiFi links). As mentioned earlier, a user may select one or more wireless modes of operation (through the selection of corresponding wireless technology or protocol) by providing corresponding mode selection input(s). Once the DACM module 200 determines at block 502 which modes are selected and, hence, which wireless links are active, the DACM module 200 may assign default antennas to the active links (block 504). As discussed earlier, such default (or "primary") antennas may be one or more antennas from the wireless mode-specific antennas 105-106 and 108-109. For example, as noted at block 504, if both the WLAN and WWAN modes are active, the antennas 105-106 (antennas A and B, respectively) may be assigned to the WWAN mode, antennas 108-109 (antennas C and D, respectively) may be assigned to the WLAN mode for non-BT related wireless transmissions/receptions, and the antenna 109 (antenna D) also may be assigned to the BT-related wireless transmissions/receptions.

The blocks 506 and 508 relate to KPI-based assessment of active wireless links and generation of a connectivity score. Generally, the DACM module 200 may generate a mode-specific score for each active wireless mode of operation by assessing performance of the active wireless mode of operation against one or more of the plurality of KPIs at each respective antenna associated with the active wireless mode of operation, as discussed below with reference to block 506. Thereafter, the DACM module 200 may generate the connectivity score by combining all mode-specific scores, as discussed below with reference to block 508. Referring now to block 506, as part of generating the mode-specific score for each active wireless mode, the DACM module 200 may assess the active wireless links on the selected default antennas (at block 504) based on one or more link-specific KPIs. Some exemplary KPIs include: (i) signal quality (for example, audio quality or video quality) of one or more wireless transmissions/receptions over the wireless link; (ii) power consumed by (or needed for) one or more wireless transmissions/receptions over the wireless link; (iii) latency associated with one or more wireless transmissions/receptions over the wireless link; (iv) throughput of one or more wireless transmissions/receptions over the wireless link; and (v) processing cost (for example, in terms of processing resources or processing time consumed by the processor 213) of one or more wireless transmissions/receptions over the wireless link. It is noted here that, in particular embodiments, each wireless link may not be assessed using the same set of KPIs. For example, each wireless link may have its own set of link-specific KPIs, which may include some or all of the above-listed KPIs or may even have other user-specified KPIs not listed above.

In particular embodiments, some of the KPIs may be user-configurable such as, for example, through a user profile setting in a Graphical User Interface (GUI) presented to the user by a software application or by the DACM module 200. The software application (or "App") may be configured to operate with a specific wireless protocol (such as, WiFi, BT, and so on) and the user may be allowed to select one or more KPIs for a wireless link associated with that wireless protocol when the software application is executed/active. The software application may be downloadable (for example, over the Internet) or may be pre-installed in the computing device 100. The software application may initially present a pre-defined or default user profile to the user, who can then override/change the default profile. For example, if the software application is a gaming application using an LTE connection for online gaming, the user may prefer the LTE connection to be optimized for bandwidth and power consumption. In that case, the user may override the pre-defined KPIs and, instead, specify that the bandwidth (or throughput) and power consumption may be prioritized for the gaming application. The DACM module 200 may then assess the performance of the wireless link supporting the gaming application based on user-defined preference(s) for one or more KPIs. As another example, at a hot spot, the user may connect through a BT or WiFi connection and may modify the user profile in the application communicating over the BT/WiFi link to optimize connectivity (or quality) of the wireless link. In that case, the DACM module 200 may then assess the performance of the BT/WiFi wireless link based on the user-defined preference for quality of the connection.

In some embodiments, the KPI parameters may be configured automatically by the DACM module 200 based on one or more pre-defined, protocol-specific criteria for each active wireless link. However, a user may be allowed to change the DACM module's initial/default KPI settings through a device display screen (not shown) of the device 100. In any event, the DACM module 200 may be provided with a set of link-specific KPIs for each type of wireless link (WWAN or WLAN) and may assess the performance of the wireless link based on the pre-defined set of link-specific KPIs, giving equal weight to each KPI unless one or more of the KPIs are modified/prioritized by the user. In certain embodiments, if necessary, the DACM module 200 may override user modifications applied through the DACM module 200 and/or a software application as mentioned above.

It is noted here that quality of a wireless signal transmitted/received by an antenna using a respective wireless link may be affected by a number of factors such as, for example, computing device's 100 orientation, surrounding noise level, Specific Absorption Rate (SAR) proximity information for the device 100, and so on. In particular embodiments, the sensors (not shown) in the sensor unit 215 may provide triggers to the DACM module 200 indicating changes in the sensed parameters such as, for example, device orientation, noise level, SAR proximity, and so on. Any improvement in the signal quality may eventually improve the throughput of the computing device 100. Hence, in certain embodiments, as part of the assessment at block 506, the DACM module 200 may take sensor triggers into consideration to determine effect of the trigger(s) on one or more link-specific KPIs. Furthermore, based on the processing of various sensor triggers, the DACM module 200 may notify the user to change the orientation of the computing device 100 as suggested by the DACM module 200 to increase the quality of antenna signals. Such notification and suggestion may be provided, for example, as a visual cue, arrow, image, or text message on a display screen of the computing device 100. The suggestion may be, for example, to place the device in a book mode, or to keep the device in a tablet mode, or to remove any object or human body part (e.g., human hand) blocking a specific antenna location on the device, and so on.

Following are examples of sensor triggers that may be received and processed by the DACM module 200 as part of KPI assessments of wireless links at block 506 in FIG. 5.
(i) It is known that SAR is a measure of the rate of absorption of RF energy in the human body. Thus, SAR is an indication of RF exposure provided by the consumer device when the device is operated in a wireless mode. Different consumer wireless devices, like smartphones and tablets, mention their SAR thresholds under corresponding wireless technologies—LTE only, WiFi only, LTE+WiFi, and so on. Thus, a trigger may be generated when there is a change in a SAR-based pre-defined location of the computing device. For example, the user-selected wireless mode of operation may have associated SAR thresholds and location/ distance requirements for physical separation between the device and the user. A change in the separation or device's pre-defined location may indicate the possibility of triggering SAR proximity. A trigger also may be generated when the human-device proximity may be unacceptable under the wireless mode-specific SAR requirement even though the device location is not changed. For example, when an antenna is transmitting at a power level that satisfies (e.g., exceeds) the SAR threshold, a SAR-related trigger may be generated. In particular embodiments, the DACM module 200 may switch the operating configuration of an antenna—for example, placing the antenna in a low-power state, selecting another antenna and switching the existing wireless link to the new antenna, and the like—when the wireless mode-specific SAR threshold is triggered.

(ii) Another exemplary trigger is an output from a proximity sensor detecting hand, body, or metallic material near an antenna. In particular embodiments, there may be one proximity sensor associated with each antenna 102-103, 105-106, and 108-109 in the device 100, and the sensor output (or trigger) may indicate the extent of proximity of a human or a non-human object to the computing device. If an antenna signal is being blocked—for example, if a human hand is partially or fully covering the antenna or an object is placed over an antenna location—the corresponding proximity sensor may detect a "weak" signal level from the antenna, which may require the DACM module 200 to take appropriate remedial measures including, for example, switching the active antennas and/or alerting the user to remove the hindrance.

(iii) Triggers also may be received from one or more accelerometers and/or gyroscopes in the device detecting the orientation (or a change in the orientation) of the device. Another trigger may indicate the hinge angle of the display screen of the device 100. The status or orientation change may include turning on/off of a display, change in the device hinge angle, data inputs from accelerometer and/or gyroscope, triggering of a SAR proximity event, magnetic or electro-magnetic interference, and the like.

(iv) In particular embodiments, a trigger may be generated when a source of electrical noise is detected. For example, the changes in the backlight brightness of a display or in the operational status of a display (for example, the turning on/off of a display) may generate electrical noise in the form of certain frequencies and their harmonics that could degrade the integrity of an antenna signal. Other sources of similar electrical noise include the operation of on-device camera(s) in the "preview" mode, frequent detections of device IDs of Universal Serial Bus (USB) devices, simultaneous operation of multiple USB devices along with wireless radios, Hard Disk Drive (HDD), and other Input/Output (I/O) units connected to the computing device, AC charging of the computing device, and the like.

After assessing each active wireless link at block 506, the DACM module 200 may generate a link score for each link based on the link-specific KPI assessment, as noted at block 508. A wireless mode-specific score may be obtained by combining each link score associated with the wireless mode-specific links. For example, in case of two WWAN links active on the default antennas 105-106, respectively, the WWAN mode-specific score may be a combination of individual link scores of the links associated with antennas 105-106. After the link scores are generated, the DACM module 200 may generate an overall connectivity score based on the individual link scores, as also noted at block 508. In one embodiment, all individual link scores (or corresponding wireless mode-specific scores) may be combined (or added) to generate the overall connectivity score. In another embodiment, a pre-defined weight may be assigned to each link score before individual link scores are added to calculate the connectivity score.

In FIG. 5, the blocks 510, 512, and 514 relate to the dynamic configuration of a shared spare antenna as per particular embodiments. At block 510, the DACM module 200 may dynamically determine the wireless usage and workload associated with each active wireless mode of operation (as determined at block 502). This determination may include analyzing the device use case and tasks needed for each use case. For example, if there are multiple audio and video data streams being handled through LTE wireless links, the DACM module 200 may analyze the tasks and resulting processing resources associated with each default antenna 105-106 supporting these wireless communications. A similar analysis may be carried out for other active default antennas 108-109. In the device use case analysis, the DACM module 200 also may consider whether the WWAN or the WLAN wireless communication predominates the device's current wireless usage, or whether both of the wireless modes equally dominate the current wireless usage, or whether the user of the device 100 has indicated any preference for communication over a specific wireless mode or specific type of wireless communication (such as, for example, streaming audio-video, or textual content uploading, or short-range BT data transfers). The device 100 may be used as a software-enabled Access Point (soft AP) or in a peer-to-peer WLAN communication, as shown in FIG. 6 (which is discussed later below).

At block 512, the DACM module 200 may dynamically evaluate the increase in the connectivity score (determined at block 508) under various spare antenna configurations. More specifically, in some embodiments, the DACM module 200 may devise one or more hypothetical operational configurations for a spare antenna based on the usage and workload determinations at block 510. Each hypothetical configuration assigns a different active wireless mode of operation to the spare antenna and treats the spare antenna as "operating" in combination with all operational (active) default antennas selected at block 504. Thus, the spare antenna under consideration is not actually operational in the assigned wireless mode, but is rather assumed to be "operational" for the task of evaluating the increase in the overall connectivity score. For example, for the software-enabled Access Point (soft AP) use case when both the WWAN and WLAN modes are active, the DACM module 200 may consider the following two hypothetical configurations taking into account all active default antennas as well as the spare antennas in the device 100: (i) Antennas 105-106 and 102-103 (antennas A, B, E, and F, respectively) operating under the WWAN mode, antennas 108-109 (antennas C and D, respectively) operating under the WLAN mode (for non-BT technologies), and antenna 109 (antenna D) also operating to support the BT protocol. (ii) Antennas 105-106 and 102 (antennas A, B, and E, respectively) operating under the WWAN mode, antennas 108-109 (antennas C and D, respectively) operating under the WLAN mode (for non-BT technologies), and antenna 103 (antenna F) operating under the WLAN mode to exclusively support the wireless communication using the BT protocol.

As part of the evaluation at block 512, the DACM module 200 may generate a hypothetical configuration-specific connectivity score for each hypothetical configuration for the spare antenna(s). Each hypothetical configuration-specific connectivity score may represent the overall performance of wireless transmissions/receptions by the computing device 100 as measured against one or more of the plurality of KPIs (mentioned at block 506) when the spare antenna(s) is/are considered "operational" in respective hypothetical configuration along with all operational default antennas in the computing device 100. In other words, a hypothetical configuration-specific connectivity score is similar to the connectivity score generated at block 508, except that the hypothetical configuration-specific connectivity score is a connectivity score for an assumed (or hypothetical) configuration that takes into account link score(s) for spare antenna(s) in addition to the link scores for default antennas under the assumption that the spare antenna(s) is/are also operational in the assumed configuration of the antennas. Thus, in the context of the soft AP use case and the two hypothetical antenna configurations mentioned at block 512, the DACM module 200 may generate two different connectivity scores—one for each hypothetical configuration of default and spare antennas.

In particular embodiments, for each hypothetical configuration-specific connectivity score, the DACM module 200 may determine the respective increase in the connectivity score (generated at block 508) by subtracting the connectivity score from the hypothetical configuration-specific connectivity score. In other words, the DACM module 200 may determine how much the overall connectivity score (at block 508) for the device 100 has increased under each hypothetical configuration at block 512—that is, when a spare antenna is considered to be "operational" in each wireless mode of operation that is active (as determined at block 502).

At block 514, the DACM module 200 may dynamically assign a spare antenna to that active wireless mode of operation which results in the highest respective increase in the connectivity score (as evaluated at block 512). Thus, in case of the two active wireless modes of operation (WWAN and WLAN) under consideration here, the DACM module 200 may share a spare antenna between these two wireless modes of operation depending on the respective (mode-specific) increase in the connectivity score. The DACM module 200 may then actually (not hypothetically) operate the spare antenna in the assigned wireless mode by allocating an active wireless link in the selected wireless mode to the spare antenna so as to yield the highest overall connectivity score when all of the operational antennas (spare and default antennas) are considered in the connectivity score determination similar to that at block 508.

The tasks discussed with reference to blocks 502 through 514 in FIG. 5 may be repeated, as indicated at block 516. Such repetition may be performed by the DACM module 200 automatically at pre-defined time intervals or on an on-going basis without any gap between two consecutive iterations. On the other hand, in particular embodiments, the repetition may occur when the DACM module 200 determines that there is a change in at least one of the following: (i) the orientation of the computing device 100, (ii) the SAR-based pre-defined location of the computing device 100, (iii) the wireless usage and workload associated with each active wireless mode of operation, and (iv) the number of wireless modes of operation that are active. A change in device orientation or SAR-based pre-defined location may be determined based on various sensor triggers discussed earlier. Changes in parameters other than those listed above also may be considered in some embodiments. When any such change is detected, the DACM module 200, in particular embodiments, may re-generate the connectivity score in view of the change (like at block 508), evaluate the antenna configuration-specific respective increase in the re-generated connectivity score (like at block 512), and operate a spare antenna in that active wireless mode which results in the highest respective increase in the re-generated connectivity score. In this manner, the performance of antennas (including default and spare antennas) under a given antenna configuration may be updated and re-evaluated during or after a change in usage model, active connections, or a system re-orientation so as to dynamically share the spare antennas with default antennas for a consistently high level of wireless experience for the user.

FIG. 6 illustrates an exemplary set 600 of antenna assignments by the DACM module 200 as per the flowchart 500 in FIG. 5 across several use cases. For ease of illustration and to avoid clutter, individual antennas are identified by reference numerals only in the computing device 100 shown at the center of FIG. 6, and not in the antenna configurations (a) through (f). In FIG. 6, it is assumed that the device orientation—as shown in the center of FIG. 6—has not changed with the different usage modes. Furthermore, because the default antennas 105-106 and 108-109 operate in a respective pre-defined (or statically-assigned) wireless mode (WWAN or WLAN), only the shared spare antennas 102-103 in FIG. 6 are labeled with their use case-specific wireless mode(s) of operation to illustrate how spare antennas 102-103 may be dynamically configured by the DACM module 200 as per different use case scenarios.

The antenna configuration 602 (case (a) in FIG. 6) relates to a use case where WWAN and WLAN links are active. Based on the processing of the tasks 502 through 514 in FIG. 5, the DACM module 200 may assign both of the shared spare antennas 102-103 to the WWAN mode of operation in the antenna configuration 602 as shown. Such an assignment may be needed, for example, where the analysis in the flowchart of FIG. 5 for the current use case indicates the need to have more WWAN bandwidth or throughput. On the other hand, for example, if the analysis in the flowchart of FIG. 5 for the current use case indicates the need to have more WLAN bandwidth or throughput, the DACM module 200 may assign the shared spare antennas 102-103 to the WLAN mode of operation as shown in the antenna configuration 604 (case (b) in FIG. 6).

The antenna configuration 606 (case (c) in FIG. 6) relates to a use case where the computing device 100 is operated as a soft AP or wireless Hostspot. Based on the processing of the tasks 502 through 514 in FIG. 5, the DACM module 200 may determine that the highest overall connectivity score (at block 514 in FIG. 5) can be obtained when the shared spare antennas 102-103 are assigned to the WWAN mode of operation. As a result, the DACM module 200 may assign the spare antennas 102-103 as shown in the antenna configuration 606. The default antennas 105-106 and 108-109 remain assigned to their respective active wireless modes of operation (WWAN or WLAN, as applicable). On the other hand, in the peer-to-peer WLAN use case for the computing device 100, the DACM module 200 may assign the spare antennas 102-103 to the WLAN mode of operation along with the WLAN mode-specific default antennas 108-109, as shown in the antenna configuration 608 (case (d) in FIG. 6). The other two default antennas 105-106 may or may not be operational in the configuration 608, depending on whether a WWAN link is active.

When the WWAN, WLAN, and Bluetooth links are active, the DACM module 200 may analyze the current use case as per the flowchart in FIG. 5 and may assign the spare antenna 102 to a WWAN link and the spare antenna 103 to a BT link, as shown in the antenna configuration 610 (case (e) in FIG. 6). In the configuration 610, the default antennas

105-106 may be assigned to respective WWAN links whereas the default antennas 108-109 may be assigned to respective non-BT WLAN links. On the other hand, when the WWAN and BT-based WLAN links are active, the DACM module 200 may assign the spare antennas 102-103 as well as the default antennas 105-106 to respective WWAN links, whereas the default antennas 108-109 may be assigned to respective BT WLAN links, as shown in the antenna configuration 612 (case (f) in FIG. 6). The examples in FIG. 6 illustrate how the spare antennas may be dynamically shared with default antennas based on wireless usage modes and active connections. It is understood that the use cases shown in FIG. 6 are exemplary only. In certain embodiments, use cases different from those shown in FIG. 6 also may be present. The DACM module 200 may be suitably configured to analyze and process such different use cases as well.

Figure 7:
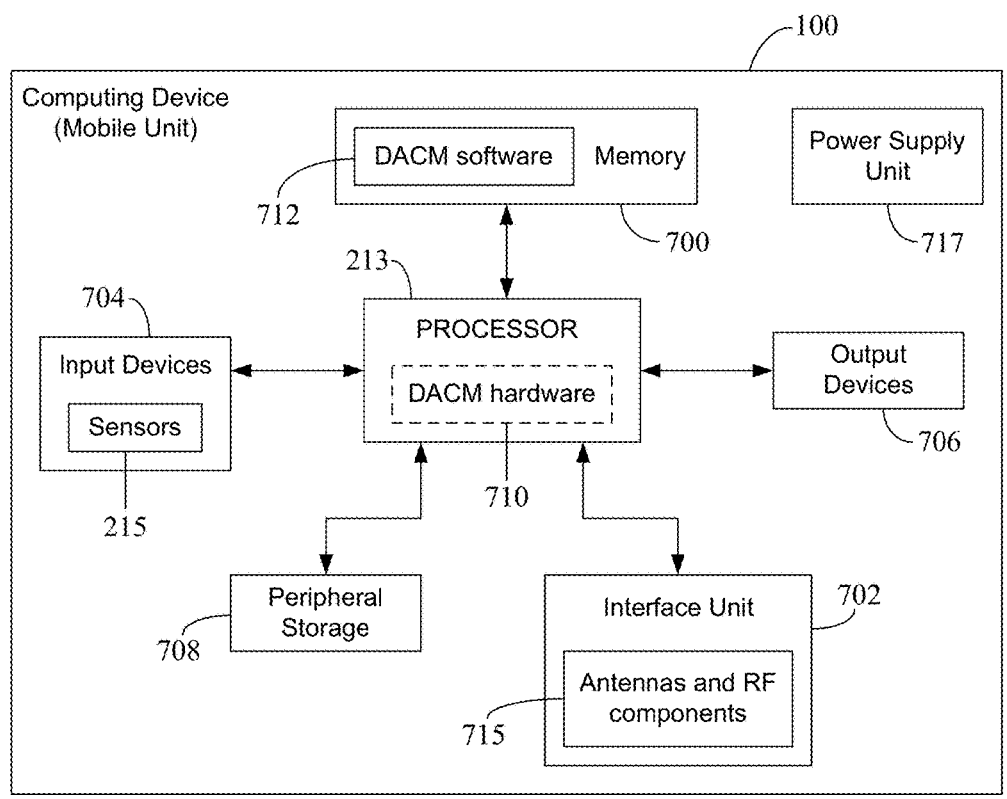
FIG. 7 illustrates an example configuration of a computing device that can be used to implement the dynamic antenna configuration techniques described herein.

FIG. 7 illustrates an example configuration of a computing device (or mobile unit) that can be used to implement the dynamic antenna configuration techniques described herein. In particular embodiments, the computing device may be the device 100 shown in FIGS. 1-2. The computing device 100 may be suitably configured to implement the DACM functionality according to the teachings of the present disclosure. The computing device 100 may include one or more processors—like the processor 213 shown in FIG. 2, a memory unit 700, an interface unit 702 providing communication interfaces, one or more input devices 704, one or more output devices 706, and a peripheral storage unit 708, all of which connected to the processor 213 as shown and configured to communicate with each other (for example, through the processor 213), such as via one or more system buses (not shown) or other suitable connection.

In one embodiment, the input devices 704 may provide data inputs—such as user input selecting a wireless mode, camera images, sensor data, and the like—to the processor 213 for further processing. A sensor unit, such as the sensor unit 215 in FIG. 2, may form a part of the input devices 704. Other input devices 704 may include, for example, a touchpad, a camera, a Global Positioning System (GPS) sensor, a computer keyboard, a touch-screen, a joystick, a physical or virtual "clickable button," a computer mouse/pointing device, and the like. A display screen is an example of the output device 706. In some embodiments, a touch-sensitive display screen may function as both an input device as well as an output device. Other examples of an output device include a graphics/display device, a computer screen or monitor, an alarm system, or any other type of data output device. In some embodiments, the input device(s) 704 and the output device(s) 706 may be coupled to the processor 2143 via an I/O or peripheral interface(s). In some embodiments, the computing device 100 may include more than one instance of the components shown. In various embodiments, all of the components shown in FIG. 7 may be housed within a single housing. In other embodiments, the computing device 100 may not include all of the components shown in FIG. 7. Furthermore, the computing device 100 may be configured as a standalone system, as a server system, as a client system, or in any other suitable form factor.

The processor (or device manager) 213 is a hardware device that may include a single processing unit or a number of processing units, all of which may include single or multiple computing units or multiple cores. When the computing device 100 is a multiprocessor system, there may be more than one instance of the processor 213 or there may be multiple processors coupled to the processor 213 via their respective interfaces (not shown). The processor 213 may include an integrated Graphics Processing Unit (GPU) or the GPU may be a separate processor device in the mobile unit 100. The processor 213 may be implemented as one or more microprocessors, microcomputers, microcontrollers, Digital Signal Processors (DSPs), Central Processing Units (CPUs), GPUs, state machines, logic circuitries, and/or any devices that manipulate signals based on operational instructions. Among other capabilities, the processor 213 may be configured to fetch and execute computer-readable instructions stored in the memory 700, the peripheral storage 708, or other computer-readable media. In some embodiments, the processor 213 may be a System on Chip (SoC).

When the DACM functionality as per teachings of the present disclosure is implemented as a combination of hardware and software, the hardware or digital logic circuits of a DACM module—such as the DACM module 200 in FIG. 2—and associated microcode may be implemented as part of the processor unit 213, as indicated by an exemplary dotted block 710 in FIG. 7. The DACM hardware 710 may communicate with a corresponding DACM software 712 (discussed below) in the memory unit 700 to cause the processor 213 to perform various DACM-related operations discussed before with reference to the embodiments in FIGS. 2-6. In some embodiments, the entire DACM module, such as the DACM module 200 in FIG. 2, may be implemented as a separate unit (not shown) connected to various circuit components and the processor 213, similar to the configuration shown in FIG. 2. Generally, the DACM functionality discussed with reference to the embodiments in FIGS. 2-6 may be considered to be provided by the computing device 100 when the DACM software 712 is executed by the processor 213.

The memory 700 and the peripheral storage unit 708 are examples of non-transitory computer media (e.g., memory storage devices) for storing instructions that can be executed by the processor 213 to perform the various functions described herein. For example, the memory unit 700 may include both volatile memory and non-volatile memory (e.g., RAM, ROM, or the like). Further, in particular embodiments, the peripheral storage unit 708 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 700 and mass storage devices constituting the peripheral storage 708 may be collectively referred to as memory or computer storage media herein, and may be a media capable of storing computer-readable, processor-executable program instructions as computer program code that can be executed by the processor 213 as a particular machine configured for carrying out the operations and functions described in the implementations herein.

As mentioned earlier, in some embodiments, the DACM functionality may be implemented in software or as a combination of hardware and software. In that case, the software portion of a DACM module, like the DACM module 200 in FIG. 2, may be a part of the memory 700 of the computing device 100, as indicated by the block 712 in FIG. 7. In other embodiments, the DACM software 712 may be a part of the peripheral storage 708 or may reside in a DACM module that is implemented as a separate unit of the computing device 100. Generally, the program instructions constituting the DACM software portion 712 may form a part of the memory unit 700 and/or the peripheral storage 708 for execution by the processor 213. When the processor 213 includes a DACM hardware portion 710, the DACM software 712 may be executed by the corresponding DACM hardware 710 with or without the help of additional processing resources in the processor 213 and/or the Operating System (OS) for the computing device 100.

The computing device 100 may also include one or more communication interfaces as part of its interface unit 702 for exchanging data or other digital content via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), LTE, Institute of Electrical and Electronics Engineers (IEEE) standard 802.11, Bluetooth®, Wireless USB, cellular, satellite, etc.), the Internet and the like. Communication interfaces in the interface unit 702 can also provide communication with external storage (not shown), such as in a storage array, network attached storage, storage area network, one or more databases, or the like. In particular embodiments, the interface unit 702 may include a plurality of broadband antennas and RF components as indicated by the block 715 in FIG. 7. The antennas in the unit 715 may be similar to the antennas 102-103, 105-106, and 108-109 in FIG. 1, and the RF components may include the radio modem 211 and the RF unit 206 shown in FIG. 2.

The computer storage media, such as the memory 700 and the mass storage devices in the peripheral storage 708, may be used to store software and data. For example, the computer storage media may be used to store the operating system (OS) for the computing device 100, various device drivers for the device 100, and the data such as audio content, video content, text data, streaming content, or any other type of content. The computer storage media also may store software applications such as a word processing application, a spreadsheet application, and the like. The program code for the software applications and the OS may be executed by the processor 213. In one embodiment, a non-transitory, computer-readable data storage medium, such as, for example, the system memory 700 or the peripheral data storage unit 708 may store program code or software for a DACM module as per particular embodiments of the present disclosure. In the embodiment of FIG. 7, the system memory 700 is shown to include such program code as DACM software 712. In some embodiments, the DACM software 712 may operate in conjunction with the host OS. The processor 213 may be configured to execute the program code for the DACM software 712, whereby the computing device 100 may be operative to perform various DACM-related tasks as per the teachings of the present disclosure. In one embodiment, such tasks may include, for example, the process steps illustrated in FIGS. 3-5. The program code for the DACM software 712 may be proprietary software or open source software, which, upon execution by the processor 213, may enable the computing device 100 to perform operations to provide the DACM functionality as per teachings of the present disclosure.

In particular embodiments, the computing device 100 may include an on-board power supply unit 717 to provide electrical power to various system components illustrated in FIG. 7. The power supply unit 717 may receive batteries or may be connectable to an AC electrical power outlet. In one embodiment, the power supply unit 717 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more non-transitory, computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method performed by a computing device, the method comprising:

activating, by the computing device, a wireless mode of operation from a plurality of wireless modes of operation;

selecting, by the computing device, an antenna from a plurality of wireless mode-specific antennas as a default antenna for the wireless mode of operation;

generating, by the computing device, a connectivity score representing a performance of wireless transmissions/receptions by the computing device relative to one or more of a plurality of Key Performance Indicators (KPIs) based on selecting the default antenna;

determining, by the computing device, a wireless usage and a workload associated with each active wireless mode of operation;

based on the wireless usage and the workload, determining, by the computing device, one or more additional operational configurations for a spare antenna, wherein each additional configuration assigns a different active wireless mode of operation to the spare antenna and treats the spare antenna as operating in combination with the default antenna;

generating, by the computing device, a configuration-specific connectivity score for each additional configuration for the spare antenna, wherein each configuration-specific connectivity score represents an overall performance of wireless transmissions/receptions by the computing device relative to one or more of the plurality of KPIs when the spare antenna is considered operational in a respective additional configuration along with the default antenna in the computing device; and for each configuration-specific connectivity score, determining, by the computing device, an increase in the connectivity score by subtracting the connectivity score from the configuration-specific connectivity score;

determining, by the computing device, an increase in the connectivity score based on selecting the spare antenna in the computing device in each wireless mode of operation that is active, wherein the spare antenna is used in addition to the plurality of wireless mode-specific antennas in the computing device; and operating, by the computing device, the spare antenna in a particular wireless mode of operation that results in a highest increase in the connectivity score.

2. The method of claim 1, wherein:
the plurality of wireless mode-specific antennas includes a first set of antennas and a second set of antennas;
the plurality of wireless modes of operation includes a first wireless mode of operation and a second wireless mode of operation; and
the method further comprises:
   operating, by the computing device, the first set of antennas for the first wireless mode of operation;
   operating, by the computing device, the second set of antennas for the second wireless mode of operation; and
   sharing, by the computing device, the spare antenna between the first and the second wireless modes of operation based on a respective increase in the connectivity score.

3. The method of claim 2, wherein each of the first set of antennas, the second set of antennas, and the spare antenna comprises an identical number of antennas.

4. The method of claim 2, wherein each antenna in the first set of antennas, each antenna in the second set of antennas, and the spare antenna are broadband antennas operable to wirelessly transmit and receive over a plurality of Radio Frequency (RF) ranges.

5. The method of claim 2, wherein the first wireless mode of operation is a Wireless Wide Area Network (WWAN) mode having RF signals spanning a range of 600 MHz to 6 GHz, and wherein the second wireless mode of operation is a Wireless Local Area Network (WLAN) mode having RF signals spanning a range of 900 MHz to 5 GHz.

6. The method of claim 1, wherein the plurality of KPIs comprises:
a signal quality of a wireless transmission/reception;
a power consumption for a wireless transmission/reception;
a latency associated with a wireless transmission/reception;
a throughput of a wireless transmission/reception; and
a processing cost of a wireless transmission/reception.

7. The method of claim 1, wherein generating the connectivity score comprises:
generating, by the computing device, a mode-specific score for each active wireless mode of operation based on determining a performance of the active wireless mode of operation against one or more of the plurality of KPIs at each antenna associated with the active wireless mode of operation; and
generating, by the computing device, the connectivity score by combining the mode-specific scores.

8. The method of claim 1, further comprising:
determining, by the computing device, that there is a change in at least one of the following:
   an orientation of the computing device,
   a Specific Absorption Rate (SAR) based pre-defined location of the computing device,
   wireless usage and workload associated with each active wireless mode of operation, or
   a number of wireless modes of operation that are active;
re-generating, by the computing device, the connectivity score based on the change to create a re-generated connectivity score;
evaluating, by the computing device, the respective increase in the re-generated connectivity score; and
operating, by the computing device, the spare antenna in that active wireless mode of operation which results in a highest respective increase in the re-generated connectivity score.

9. A method performed by a computing device, the method comprising:
when a first wireless mode of operation is active, operating, by the computing device, a first antenna as a default antenna for the first wireless mode of operation, wherein the computing device has three different antennas comprising the first antenna, a second antenna, and a third antenna;
when a second wireless mode of operation is active, operating, by the computing device, the second antenna as a default antenna for the second wireless mode of operation, wherein the first and the second wireless modes of operation are different;
generating, by the computing device, a connectivity score representing a performance of wireless transmissions/receptions by the computing device relative to one or more of a plurality of Key Performance Indicators (KPIs) when the first and the second antennas are operated as default antennas,
generating, by the computing device, a mode-specific score for each active wireless mode of operation by assessing performance of the active wireless mode of operation against one or more of the plurality of KPIs at a respective one of the first and the second antennas associated with the active wireless mode of operation, wherein the plurality of KPIs comprises:
   a signal quality of a wireless transmission/reception,
   a power consumption for a wireless transmission/reception,
   a latency associated with a wireless transmission/reception,
   a throughput of a wireless transmission/reception, and
   a processing cost of a wireless transmission/reception;
generating, by the computing device, the connectivity score by combining the mode-specific scores;

determining, by the computing device, a respective increase in the connectivity score based on selecting the third antenna in each of the first and the second wireless modes of operation;

determining, by the computing device, a wireless usage and a workload associated with each active wireless mode of operation;

based on the wireless usage and workload, determining, by the computing device, one or more additional operational configurations for the third antenna, wherein each additional configuration assigns a different active wireless mode of operation to the third antenna and treats the third antenna as operating in combination with the first and the second antennas;

generating, by the computing device, a configuration-specific connectivity score for each additional configuration for the third antenna, wherein each configuration-specific connectivity score represents an overall performance of wireless transmissions/receptions by the computing device relative to one or more of the plurality of KPIs when the third antenna is considered operational in a respective additional configuration along with the first and the second antennas in the computing device;

for each configuration-specific connectivity score, determining, by the computing device, the respective increase in the connectivity score by subtracting the connectivity score from the configuration-specific connectivity score; and operating, by the computing device, the third antenna in that one of the first and the second wireless modes of operation which results in a higher respective increase in the connectivity score.

10. The method of claim 9, wherein each of the first, the second, and the third antennas comprises at least one antenna.

11. The method of claim 10, wherein each of the first, the second, and the third antennas comprises an identical number of antennas.

12. The method of claim 9, further comprising:
operating, by the computing device, the first antenna for the first wireless mode of operation;
operating, by the computing device, the second antenna for the second wireless mode of operation; and
sharing, by the computing device, the third antenna between the first and the second wireless modes of operation based on the respective increase in the connectivity score.

13. The method of claim 12, wherein the first wireless mode of operation is a Wireless Wide Area Network (WWAN) mode having Radio Frequency (RF) signals spanning a range of 600 MHz to 6 GHz, and wherein the second wireless mode of operation is a Wireless Local Area Network (WLAN) mode having RF signals spanning a range of 900 MHz to 5 GHz.

14. A computing device comprising:
a memory for storing program instructions;
a plurality of wireless mode-specific antennas;
a spare antenna that is in addition to the plurality of wireless mode-specific antennas; and
a processor coupled to the memory, the plurality of wireless mode-specific antennas, and the spare antenna, wherein the processor executes the program instructions to:
activate a wireless mode of operation from a plurality of wireless modes of operation;

select an antenna from the plurality of wireless mode-specific antennas as a default antenna for the wireless mode of operation;

generate a connectivity score representing a performance of wireless transmissions/receptions by the computing device relative to one or more of a plurality of Key Performance Indicators (KPIs) based on selecting the default antenna;

determine, by the computing device, a wireless usage and a workload associated with each active wireless mode of operation;

based on the wireless usage and the workload, determine, by the computing device, one or more additional operational configurations for a spare antenna, wherein each additional configuration assigns a different active wireless mode of operation to the spare antenna and treats the spare antenna as operating in combination with the default antenna;

generate, by the computing device, a configuration-specific connectivity score for each additional configuration for the spare antenna, wherein each configuration-specific connectivity score represents an overall performance of wireless transmissions/receptions by the computing device relative to one or more of the plurality of KPIs when the spare antenna is considered operational in a respective additional configuration along with the default antenna in the computing device; and for each configuration-specific connectivity score, determine, by the computing device, an increase in the connectivity score by subtracting the connectivity score from the configuration-specific connectivity score;

determine an increase in the connectivity score based on selecting the spare antenna in the computing device in each wireless mode of operation that is active, wherein the spare antenna is used in addition to the plurality of wireless mode-specific antennas in the computing device; and operate the spare antenna in a particular wireless mode of operation that results in a highest increase in the connectivity score.

15. The computing device of claim 14, wherein:
the plurality of wireless mode-specific antennas includes a first antenna and a second antenna, and
the plurality of wireless modes of operation includes a first wireless mode of operation and a second wireless mode of operation.

16. The computing device of claim 14, wherein the plurality of KPIs comprises:
a signal quality of a wireless transmission/reception;
a power consumption for a wireless transmission/reception;
a latency associated with a wireless transmission/reception;
a throughput of a wireless transmission/reception; and
a processing cost of a wireless transmission/reception.

17. The computing device of claim 14, wherein generating the connectivity score comprises:
generating, by the computing device, a mode-specific score for each active wireless mode of operation based on determining a performance of the active wireless mode of operation against one or more of the plurality of KPIs at each antenna associated with the active wireless mode of operation; and
generating, by the computing device, the connectivity score by combining the mode-specific scores.

18. The computing device of claim 15, wherein the processor further executes the program instructions to:
- operate the first antenna in the first wireless mode of operation;
- operate the second antenna in the second wireless mode of operation; and
- share the spare antenna between the first and the second wireless modes of operation based on a respective increase in the connectivity score.

19. The computing device of claim 14, the spare antenna and the default antenna are broadband antennas operable to wirelessly transmit and receive over a plurality of Radio Frequency (RF) ranges.

20. The computing device of claim 14, wherein:
- a first wireless mode of operation of the computing device comprises a Wireless Wide Area Network (WWAN) mode having radio frequency (RF) signals within a range of about 600 MHz to about 6 GHz; and
- a second wireless mode of operation of the computing device comprises a Wireless Local Area Network (WLAN) mode having RF signals within a range of about 900 MHz to about 5 GHz.

* * * * *